United States Patent
Jeans

(10) Patent No.: US 10,401,753 B2
(45) Date of Patent: Sep. 3, 2019

(54) ROLLER DAMPERS

(71) Applicant: Hewlett-Packard Development Company, L.P., Fort Collins, CO (US)

(72) Inventor: Albert Jeans, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/559,013

(22) PCT Filed: May 8, 2015

(86) PCT No.: PCT/US2015/029960
§ 371 (c)(1),
(2) Date: Sep. 15, 2017

(87) PCT Pub. No.: WO2016/182547
PCT Pub. Date: Nov. 17, 2016

(65) Prior Publication Data
US 2018/0081294 A1    Mar. 22, 2018

(51) Int. Cl.
| | |
|---|---|
| *G03G 15/02* | (2006.01) |
| *G03G 15/00* | (2006.01) |
| *G03G 15/10* | (2006.01) |
| *F16F 7/108* | (2006.01) |
| *F16G 15/14* | (2006.01) |
| *F16F 15/14* | (2006.01) |

(52) U.S. Cl.
CPC ......... *G03G 15/0233* (2013.01); *F16F 7/108* (2013.01); *F16F 15/1435* (2013.01); *F16F 15/1442* (2013.01); *G03G 15/025* (2013.01); *G03G 15/10* (2013.01); *G03G 15/505* (2013.01); *G03G 15/5033* (2013.01); *G03G 15/75* (2013.01); *G03G 15/751* (2013.01)

(58) Field of Classification Search
CPC ........... G03G 15/0233; G03G 15/5033; G03G 15/505; G03G 15/75; G03G 15/751; G03G 15/757; F16F 7/108; F16F 15/1435; F16F 15/1442
See application file for complete search history.

(56) References Cited

U.S. PATENT DOCUMENTS

| | | |
|---|---|---|
| 5,090,668 A | 2/1992 | Hamada |
| 5,235,909 A | 8/1993 | Gerstenberger et al. |

(Continued)

FOREIGN PATENT DOCUMENTS

| | | |
|---|---|---|
| CN | 203557856 U | 4/2014 |
| EP | 0585897 A1 | 3/1994 |

(Continued)

OTHER PUBLICATIONS

"Elastomers, Gaskets & Seals: Softening Sound", Jun. 1, 2005.

*Primary Examiner* — Joseph S Wong
(74) *Attorney, Agent, or Firm* — HP Inc. Patent Department

(57) ABSTRACT

In examples provided herein, a roller damper comprises a damper body element having mass and having a shape to fit an interior of a tubular roller element. The roller element is associated with a natural frequency. The roller damper also comprises an elastomer support member coupled to the damper body element. The mass of the damper body element and the elastomer support member are selected based on the natural frequency of the tubular roller element.

19 Claims, 11 Drawing Sheets

(56) References Cited

U.S. PATENT DOCUMENTS

| | | | |
|---|---|---|---|
| 5,420,664 A * | 5/1995 | Miwa | F16F 15/126 |
| | | | 399/167 |
| 6,702,076 B2 | 3/2004 | Koleda | |
| 6,757,508 B2 | 6/2004 | Fujishiro | |
| 7,571,677 B2 | 8/2009 | Christel et al. | |
| 7,681,869 B2 | 3/2010 | Digernes | |
| 8,186,676 B2 | 5/2012 | Urban et al. | |
| 2003/0139217 A1* | 7/2003 | Zhu | F16F 15/1442 |
| | | | 464/180 |
| 2004/0042822 A1* | 3/2004 | Fujishiro | G03G 15/751 |
| | | | 399/159 |
| 2005/0226652 A1 | 10/2005 | Choi | |
| 2006/0025253 A1 | 2/2006 | Giannetti et al. | |
| 2007/0144852 A1* | 6/2007 | Furuya | F16F 7/108 |
| | | | 188/379 |
| 2008/0003017 A1 | 1/2008 | Fujishiro et al. | |
| 2009/0270189 A1* | 10/2009 | Kawakatsu | F16F 15/1442 |
| | | | 464/180 |

FOREIGN PATENT DOCUMENTS

| | | |
|---|---|---|
| EP | 1260875 A1 | 11/2002 |
| GB | 2073368 | 10/1981 |
| WO | WO-2011064129 A1 | 7/2011 |

* cited by examiner

ROLLER DAMPERS

BACKGROUND

Some liquid electrophotographic printing presses use a charge roller to charge a photo imaging plate. A uniformly charged photo imaging plate can then be exposed to a light source to develop a latent image that include regions of higher and lower voltages that make up the image. Oppositely charged liquid electrophotographic inks can then be applied to the photo imaging plate. Droplets of the liquid electrophotographic inks are attracted to regions in the latent image with higher voltages. The ink on the photo imaging plate can then be transferred to an intermediate transfer media or directly to the printed media, such as paper.

DETAILED DESCRIPTION

Figure 1:
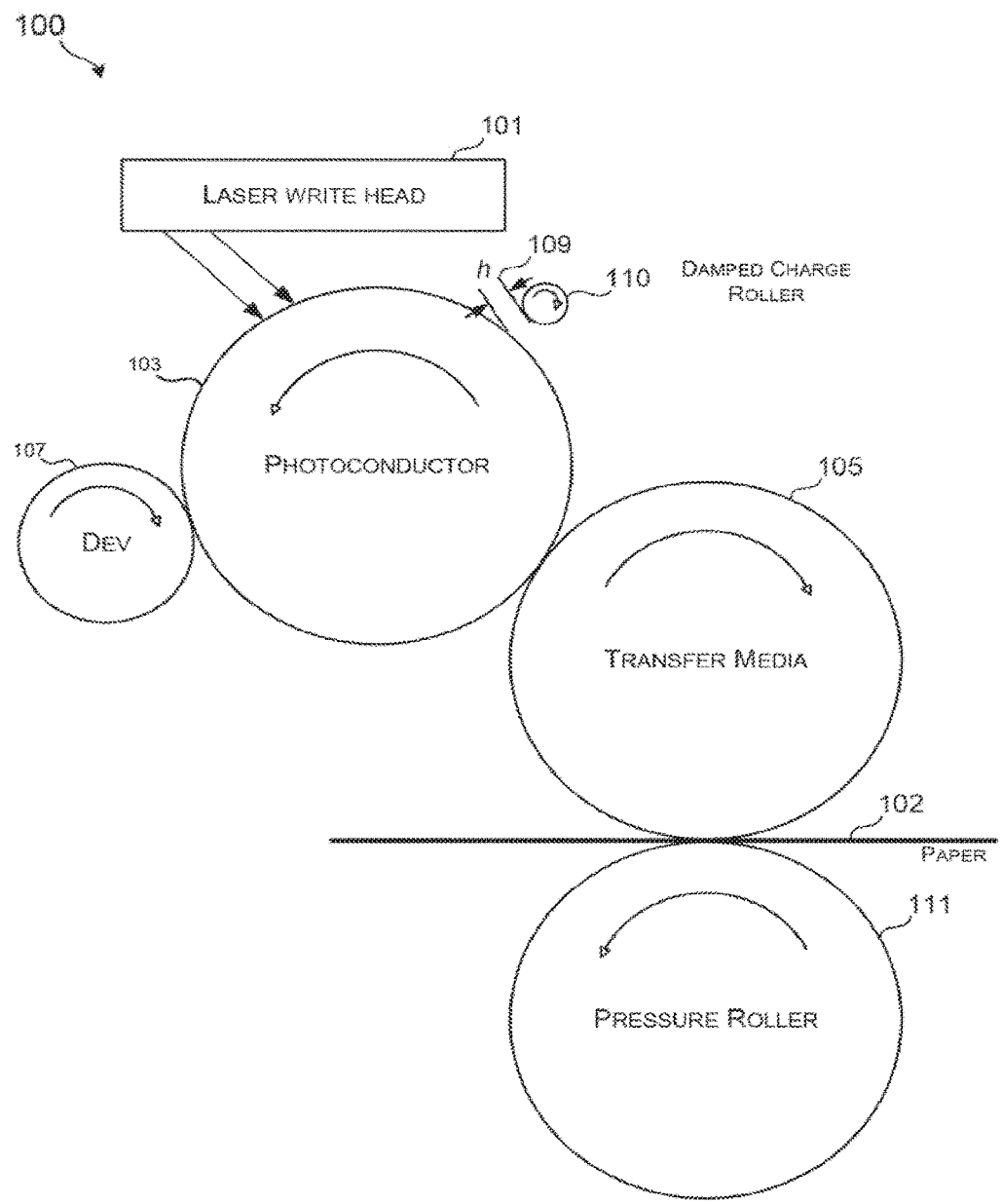
FIG. 1 illustrates a schematic of an electrophotographic printing press equipped with an example damped charge roller.

The present disclosure describes techniques for systems, methods, and devices for damping vibrations of a charge roller in a liquid electrophotographic printing press. A charge roller in such liquid electrophotographic printing presses is used to apply a charge to the photo imaging plate. Uniformly charging the photo imaging plate is one element of the printing process that can improve the resulting printed image quality. FIG. 1 depicts a schematic of an example liquid electrophotographic printing press 100 in which various implementations of the present disclosure can be used.

In such printing presses such as liquid electrophotographic printing press 100, the damped charge roller 110 rotates relative to the photo conductor imaging plate 103 to transfer charge to its surface. As the photo conductor 103 rotates, the laser write head 101 can selectively expose regions of the photo conductor 103 to high intensity light (e.g., focused laser spots). The light incident on the charged surface of the photo conductor 103 rapidly discharges the local charge to generate a latent image composed of regions of high and low voltages.

When the developer 107 applies liquid electrophotographic ink, small charged droplets of ink are more strongly attracted to the regions of high voltages. The liquid electrophotographic ink image on the photoconductor 103 can then be transferred to a transfer media 105, commonly referred to as a transfer blanket, and then pressed onto media 102 (e.g., paper). In the example shown, the print media 102 is pressed between the transfer media 105 and a pressure roller 111.

To uniformly charge the photo imaging plate, a spinning charge roller is charged to a high voltage and positioned close to a photo imaging plate. The distance between the charge roller and the photo imaging plate determines how much of the charge is transferred from the charge roller to the photo imaging plate through a glow discharge. In some systems, the distance between the charge roller and photo imaging plate is on the order of tens of microns and the charge transfer rate ratio is around 5 volts/micron.

As described herein, the ability to uniformly apply a charge to the surface of the photoconductor 103 is one element in producing high-quality printed images using a liquid electrophotographic printing press. Nonuniformities in the charging of the photo conductor 103 can lead to nonuniformities and defects in the resulting printed image. For example, one possible print defect can include banding in the density of the ink or pigments and can be directly related to the banding of charge levels on the photoconductor 103. Variations in the charge levels on the surface of the photoconductor 103 can be the result of unwanted vibrations in the damped charge roller 110 that cause variation in the distance h 109. In some instances, the level of charge transferred from the damped charge roller 110 to the photoconductor 103 is strongly dependent on the separation between the two surfaces. Accordingly, implementations of the present invention can be used to control the distance h 109 and, thus, potentially lead to improved printed image quality.

Figure 2:
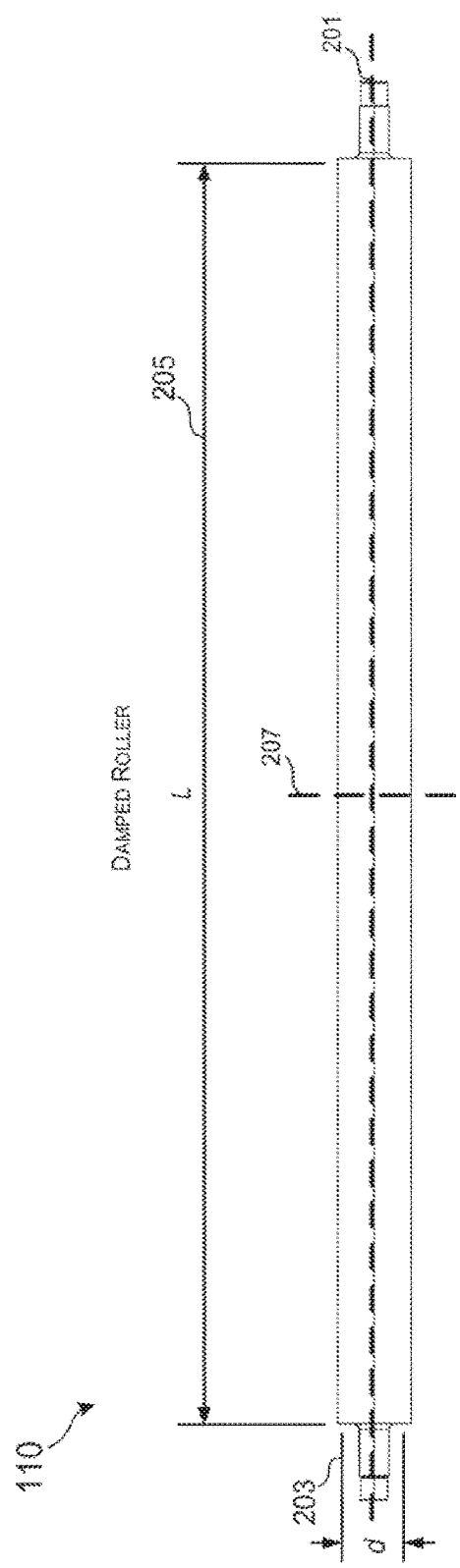
FIG. 2 illustrates an example damped roller.

As illustrated in FIG. 2, damped charge roller 110 can comprise a roller element and corresponding rotating (e.g., bearings, hubs, etc.) and/or mounting elements (e.g., brackets, axels, etc.). In various implementations, the roller element can include a cylinder or tube having a diameter d 203 and a length L 205. The cylinder or tube can be a conductor. For example, the roller element can be a metallic hollow cylinder or tube. The roller element can be supported on either end and rotated about its longitudinal axis 201. While spinning about its longitudinal axis 201, the roller element can be charged to a voltage according to the characteristics of the liquid electrophotographic printing press in which it is disposed.

Due to various inconsistencies in the manufacturing of the charge roller 110 and vibrations of other components of the liquid electrophotographic press 100 (e.g., the rotation of the photo conductor 103, the transfer media 105, the developer 7, the pressure roller 111, etc.), the charge roller 110 can have a tendency to vibrate in at least one vibrational mode in at least one direction perpendicular to the longitudinal axis 201. For example, the various regions or segments of the roller element can vibrate and consequently bend in a direction parallel to a transverse axis 207. Such bending can cause the distance h 109 to vary over time.

Figure 3:
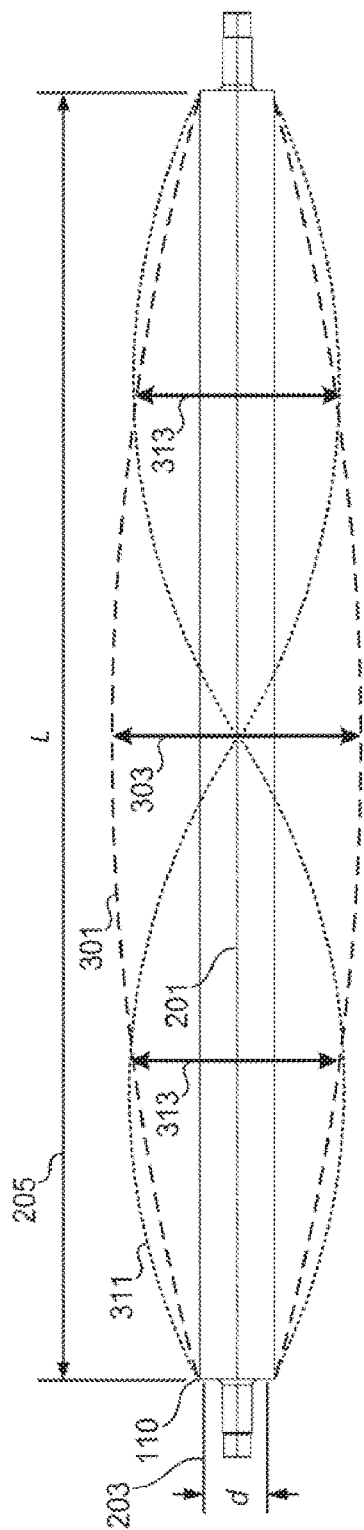
FIG. 3 illustrates example vibration nodes.

FIG. 3 depicts example vibrational modes of charge roller 110 that implementations of the present disclosure can be used to damp. The specific vibrational modes excited in the charge roller 110 can depend on the natural frequency of the charge roller 110. As used herein, "natural frequency" describes the frequency at which a particular charge roller 110, or the roller element thereof, will vibrate in the absence of any driving or damping force.

For example, when subject to vibrations or impacts, a first vibrational mode 301 can be excited in the charge roller. As shown, vibrational mode 300 can include nodes (e.g., places on the charge roller 110 that do not vibrate or oscillate) at the ends of the roller and an anti-node 303 located at or near the middle of the roller. The location of the anti-node 303 can indicate the apex, or maximum amplitude, of the bend in the charge roller 110 for a corresponding vibrational mode 301. The charge roller 110 may be excited into a second vibrational mode 311 having nodes at the ends of the roller and locations corresponding to the first vibrational mode's anti-node 303. Corresponding anti-nodes 313 of vibrational mode 311 can be located as shown between the ends of the roller and the central node (e.g., at 303).

While only two vibrational modes are illustrated in FIG. 3, other higher degree vibrational modes associated with corresponding higher degree natural frequencies of the charge roller 110 are also possible. Any number of vibrational modes of the charge roller 110 can be damped with corresponding roller dampers at appropriate anti-nodes. The selection of the vibrational modes to be damped in a particular charge roller 110 can be based on an identification of the vibrational modes that cause the largest magnitude of bending and, consequently, the largest variation in the distance h 109 between the charge roller 110 and the photo conductor 103.

As described herein, vibrational modes of the charge roller 110, such as vibrational modes 301 and 311, can be damped by placing an inertial mass having a matching natural frequency at the anti-nodes. As used herein, the term "damping" refers to an influence that has the effect of reducing, restricting or preventing vibrations. In physical systems, such as the charge roller 110, damping is produced by processes that dissipate the energy stored in the vibration. One example damping force can include inertial drag provided by an appropriately placed inertial mass paired with a corresponding viscoelastic elastomer In implementations described herein, the charge roller 110 can include a conductive cylindrical wall (e.g. a hollow metal tube) into which an inertial mass and an associated elastomer can be inserted. Accordingly, an inertial mass and elastomer having a natural frequency that matches the natural frequency of a particular vibrational mode can be internally placed within the charge roller 110 at a point along its length L 205 that corresponds to an anti-node of the vibrational mode. For example, a roller damper, comprising a mass and elastomeric suspension system that in combination have a natural frequency that matches a natural frequency of the roller, can be inserted into charge roller 110 at an anti-node position of the corresponding vibrational mode.

Figure 4:
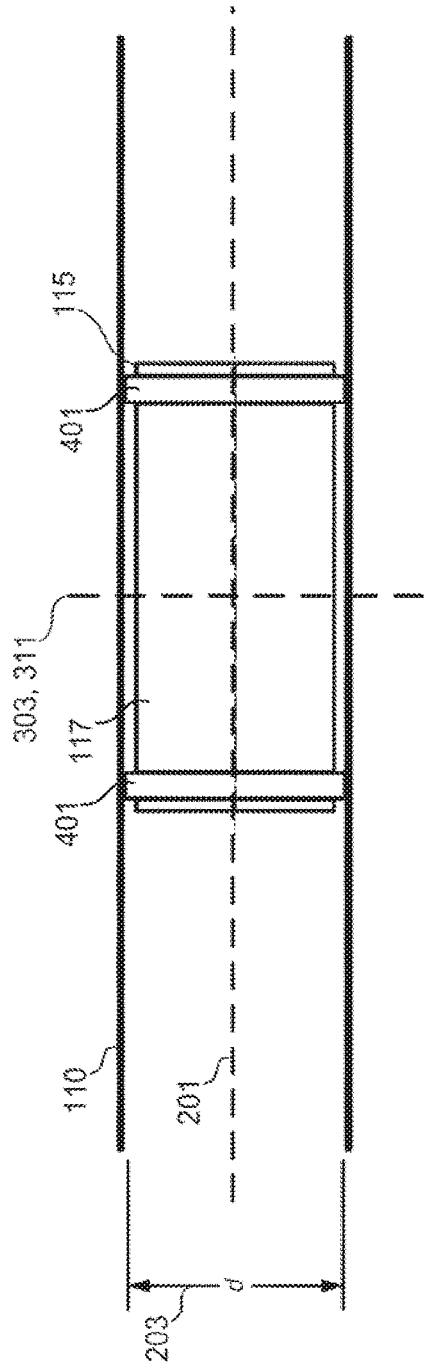
FIG. 4 depicts a detailed internal view of an example damped roller.

FIG. 4 illustrates the placement of a roller damper 115 having a particular natural frequency inside the charge roller 110 in a position corresponding to the location of an anti-node (e.g., 303, 311) of a vibrational mode. As shown, the roller damper 115 can include a damper body element 117 and at least one elastomer support member 401. In such implementations, the damper body element 117 can include various materials of appropriate density, such as steel, brass, lead, and the like, to provide a mass large enough for damping and in a volume small enough to fit inside the interior of the charge roller 110 (e.g., inner diameter d 203).

In the example shown in FIG. 4, the damper body element 117 can include a cylindrical body of a dense material. The elastomeric suspension of the damper body element 117 within the charge roller 110 can be provided by elastomer support members 401. The elastomer support members 401 can include multiple bands of elastomers disposed around the circumference of the cylindrical body of the damper body element 117. Accordingly, the elastomer support members 401 can be disposed between the outer surface of the damper body element 117 and the internal surface of the charge roller 110. As such, the elastomer support members 401 and the dimensions of the damper body element 117 can be dimensioned to fit within diameter d 203. In the example shown in FIG. 4, the roller damper 115 can be held in position within the charge roller 110 by the friction provided by the elastomer support members 401. In such implementations, the roller damper 115 is said to be "friction fit" in the charge roller 110.

The natural frequency of the roller damper 115 can be associated with the dimensions and mass of the damper body element 117 and the elastomeric characteristics of elastomer support members 401, The elastomeric characteristics of the elastomer support members 401 can be a function of the dimensions and the particular material properties (e.g. density, stiffness, loss coefficient, etc.) of the selected elastomer. In some instances, the loss coefficient, the stiffness, density, and other material properties of an elastomer can be correlated to one another. For instance, elastomeric materials for vibration isolation use a mechanism known as hysteretic damping to dissipate energy. When elastomeric materials are deformed, internal friction causes high energy losses to occur. The loss coefficient is used to quantify the level of hysteretic damping of a material. The loss coefficient relates the energy dissipated from the system to the energy stored in the system for every vibration. The higher the loss coefficient, which has correlations with stiffness and density, the greater the damping.

Accordingly, to match the natural frequency of the roller damper 115 to a natural frequency of the charge roller 110, materials and dimensions of the damper body element 117 and elastomeric characteristics of the elastomer support members 401 can be selected. The inertia of the mass of the damper body element 117 resists motion of the charge roller 110 thus causing deformation of the elastomer support members 401. The deformation of the elastomer support members absorbs energy, thus damping the vibration of the corresponding vibrational mode.

Damping of the vibration in a charge roller can reduce the variation in the distance h 109 to improve print quality in a liquid electrophotographic printing press. In addition, damping of the vibration of the charge roller 110 can also increase the precision of the grinding process used to manufacture the charge roller 110. Such improvements in the manufacture process can improve the quality of the charge roller 110 (e.g. uniformity, balance, smoothness of the exterior surface, etc.) and increase the throughput. While implementations of the present disclosure are described in the context of charge rollers 110 in a liquid electrophotographic printing press, implementations of the present disclosure may also be useful in suppressing vibrations in other systems that use hollow or cylinders tubes as rollers. For example, a roller damper 115 can be added to a roller in a web transport or conveyor system to reduce vibrations, and as a result, reduce noise in a shipping, manufacturing, or shipping environment in which it is installed.

Figure 5:
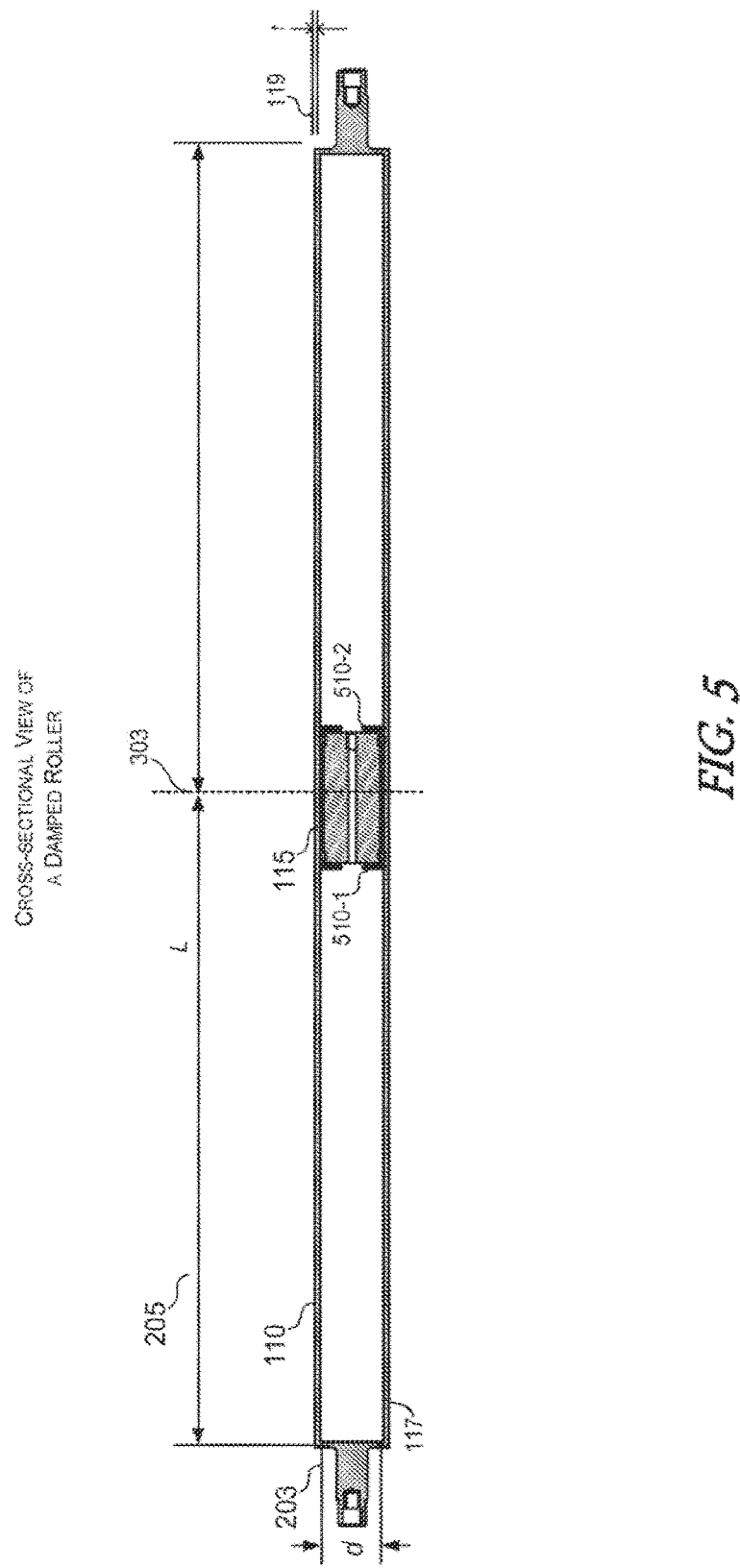
FIG. 5 depicts a cross-sectional view of an example damped roller.

FIG. 5 illustrates an example placement of a natural frequency matched roller damper 115 at the location of an anti-node 303 associated with a first vibrational mode of the charge roller 110. In the example shown, the roller damper 115 can be prevented from making large excursions by retaining rings 510. Such retaining rings 510 can stabilize the placement of the roller damper 115 during normal handling and/or shipping. In some implementations, the retaining rings do not make contact with the damper body element during normal operation to avoid interfering with the damping effect on the charge roller. The roller damper 115 can be dimensioned to fit the inner diameter d 203 of charge roller 110. Similarly, the retaining rings 510 can have dimensions and spring constants to fit within the inner diameter d 203 of the charge roller 110 without deforming the wall of the roller having a thickness t 119. In various implementations, the dimensions and spring constant of the retaining rings 510 can be selected to provide just enough force to capture the roller damper 115 to prevent it from moving too far from its intended position within the charge roller 110. Minor deviations from the roller damper 115 from its intended position can be corrected by a user. For example, a user can use positioning rod to push the roller damper 115 away from the retaining rings 510.

Figure 6:
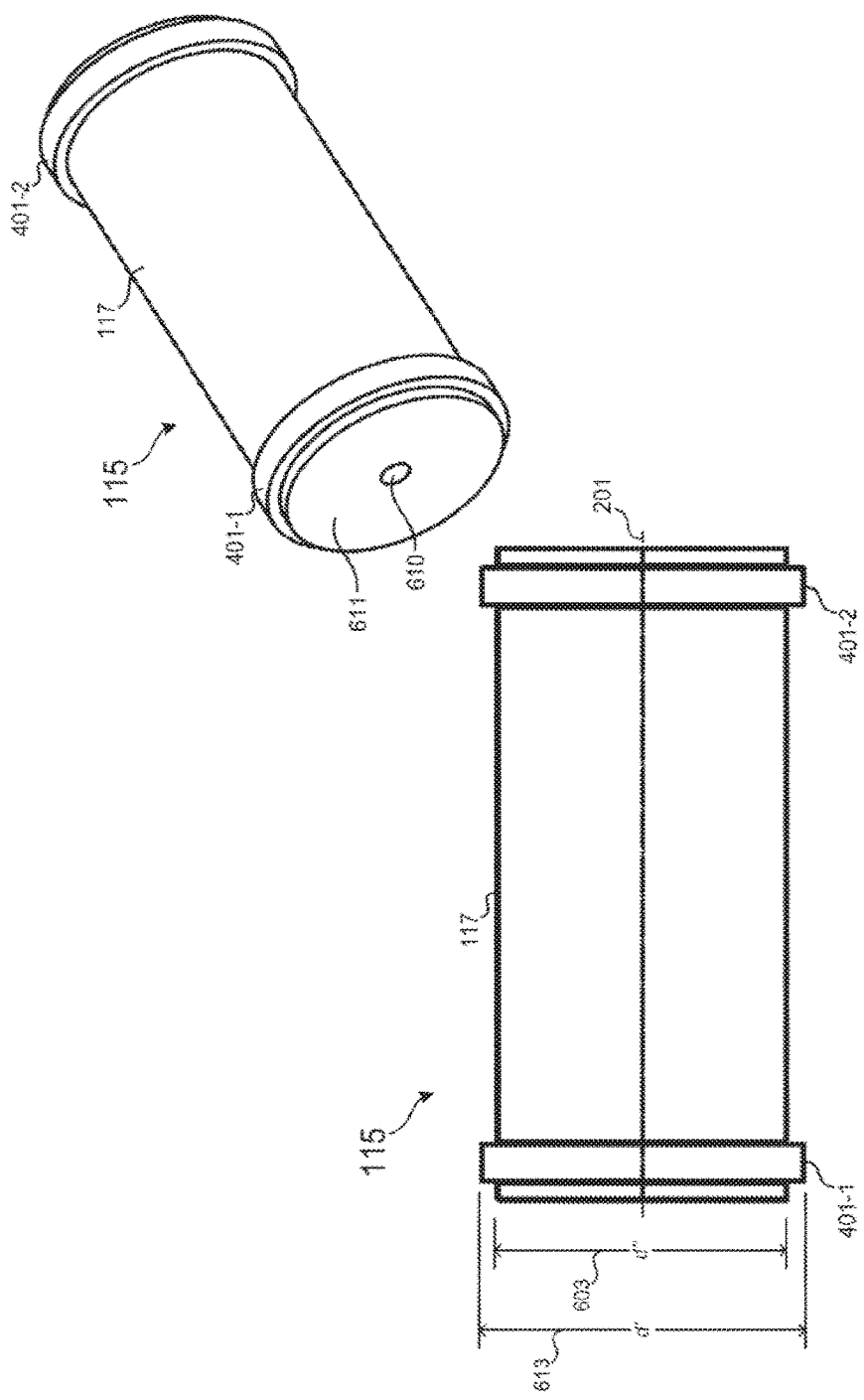
FIG. 6 depicts a side view and an isometric view of an example damper element.

FIG. 6 depicts side and isometric views of the exterior of an example roller damper 115. In the example shown, the roller damper 115 can include a damper body element 117 and multiple elastomer supports members 401. In various implementations, the damper body element can have any geometric shape. In the particular example shown in FIG. 6, the damper body element 117 comprises a thick walled or solid cylinder. In some implementations, the cylinder can include a hole 610 in the face 611 of the cylinder. The hole can be dimensioned to accept an installation rod that can be used to position the roller damper 115 within the charge roller 110. For example, the hole 610 can have a diameter and internal threads to accept and engage with a correspondingly dimensioned and threaded rod that can be used position the roller damper 115 in the interior of the charge roller 110.

As described herein, the dimensions of the elastomer support members 401, such as the diameter d' 613 of the elastomer bands, and diameter d'' 603 of the damper body element 117, can be selected to allow for a friction fit between the exterior surface of damper body element 117 and the interior surface of the charge roller 110. As such, diameters d' 613 can be equal to or greater than diameter d 203.

Figure 7:
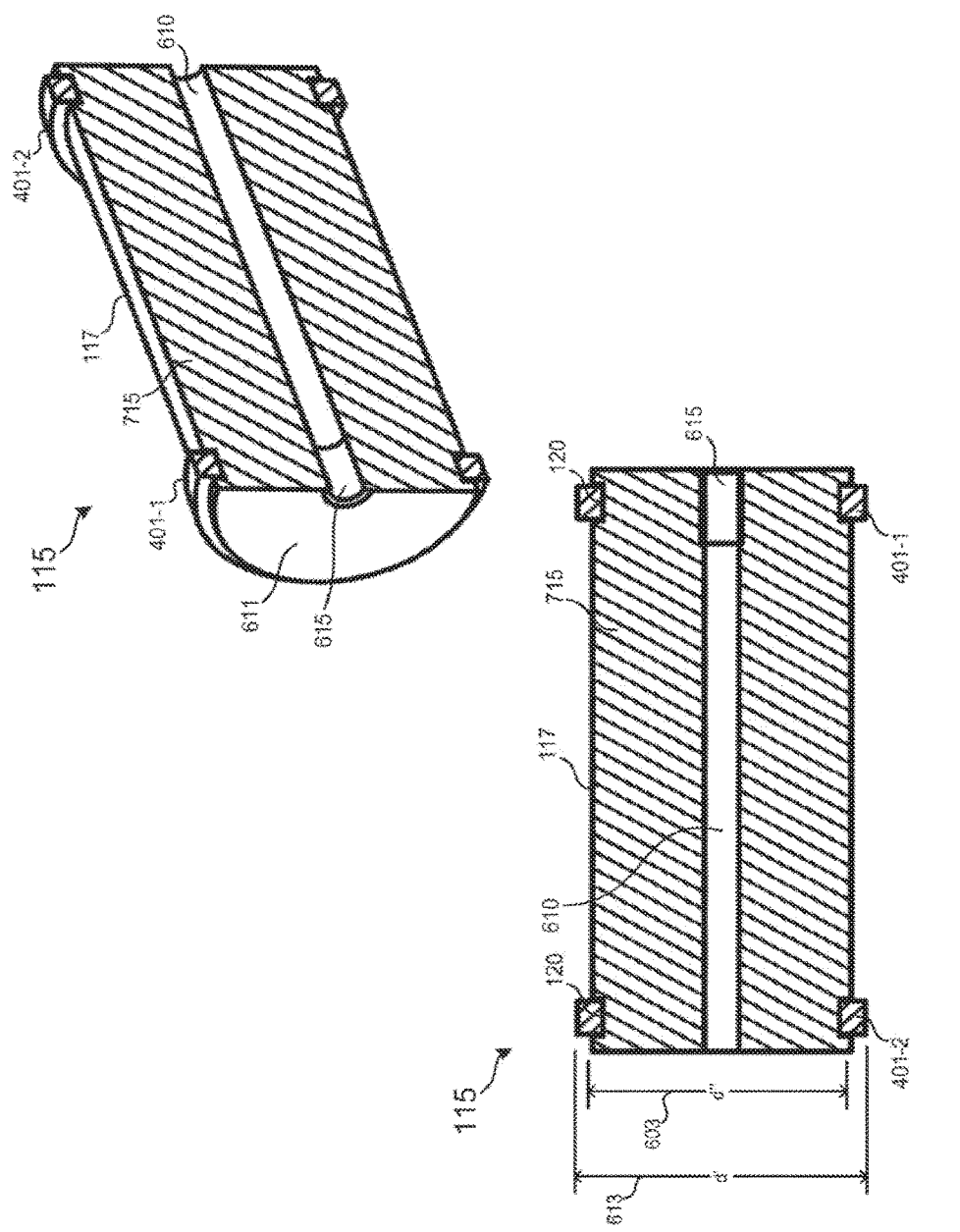
FIG. 7 depicts side and isometric cross-sectional views of an example damper element.

FIG. 7 depicts cross-sectional side and isometric views of an example roller damper 115. As shown, the exterior surface of the damper body element 117 can include grooves 120 dimensioned to match the dimensions of the elastomer support members 401. In such implementations, the elastomer support members 410 can fit in grooves 120. Placement of the elastomer support members 410 into the grooves 120 can aid in maintaining the positions of the elastomer support members 410 in the desired position on the external surface of the damper body element 117. In particular, placement of the elastomer support members 410 in the grooves 120 can prevent the elastomer support members 410 from sliding along the surface of the damper body element 117 as the roller damper 115 is inserted into the charge roller 110.

FIG. 7 also depicts a through hole 610 in material 715 oriented along the longitudinal axis of the damper body element 117. Inclusion of the through hole 610 in implementations of the present disclosure allows for air to escape as the roller damper 115 is inserted into a closed-end charge roller 110. FIG. 7 also indicates a region 615 of the through hole 610 that can include features, such as threads, to engage an installation rod use a position the roller damper 115.

Figure 8:
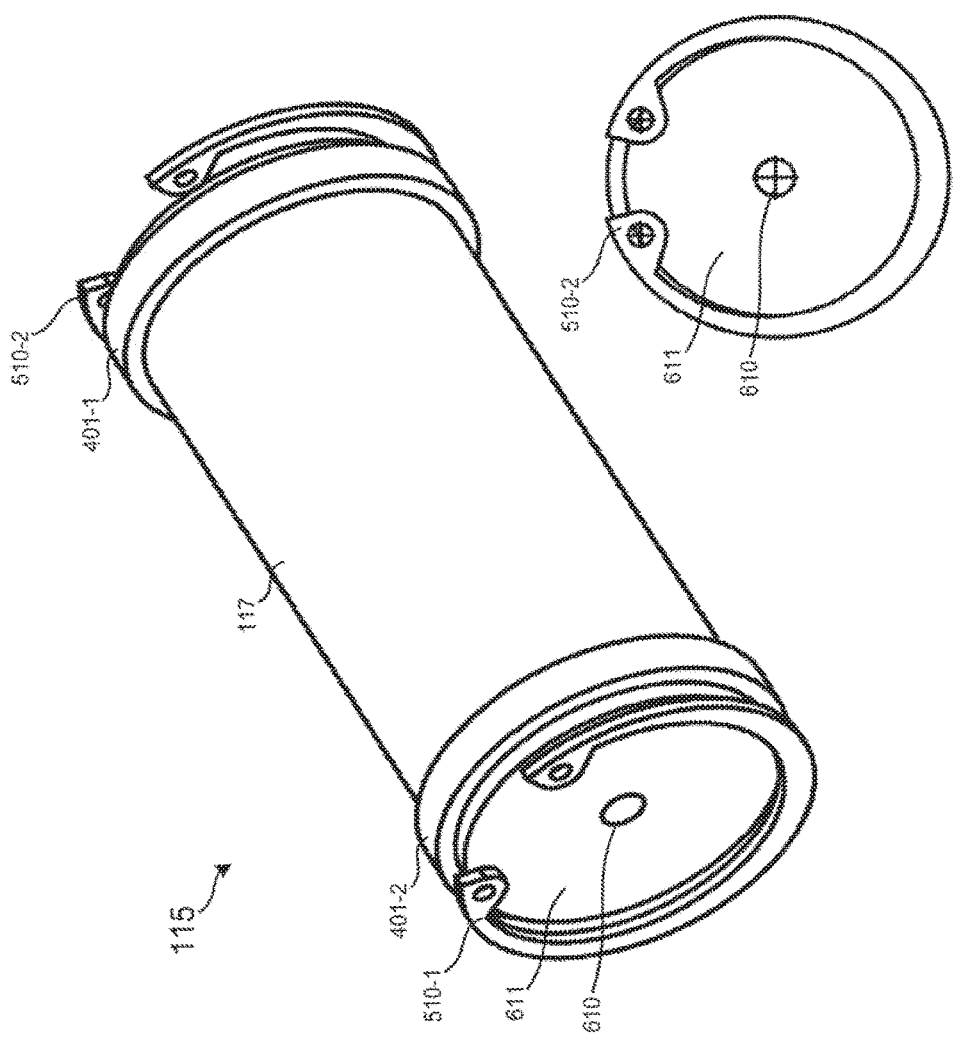
FIG. 8 depicts an isometric view of an example damper element and associated retaining rings

FIG. 8 depicts an isometric view of a roller damper 115 that includes retaining rings 510. The retaining rings 510 can either be coupled to the ends of the damper body element 117 or inserted into the charge roller 110 separately and positioned to have space between the ends of the roller damper 115 (e.g., the retaining rings need not touch the end faces of the roller damper 115).

Figure 9:
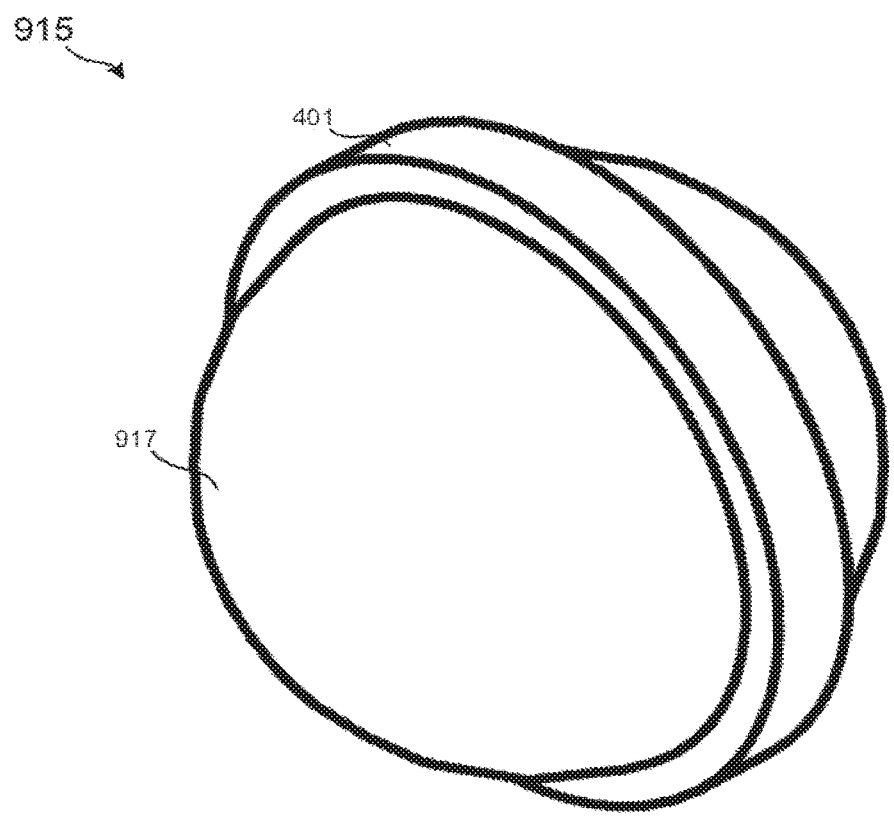
FIG. 9 depicts an example spherical damper element.

FIG. 9 depicts an example roller damper 915, according to various implementations of the present disclosure. As shown, the roller damper 915 can include a damper body element 917 having a spherical or semi-spherical shape. An elastomer support member 401 can be disposed around a circumference of the damper body element 917. As described herein, the dimensions and mass of the damper body element 917 and the elastomeric characteristics of the elastomer support member 401 can be selected to match a natural frequency of a corresponding charge roller 110.

Figure 10:
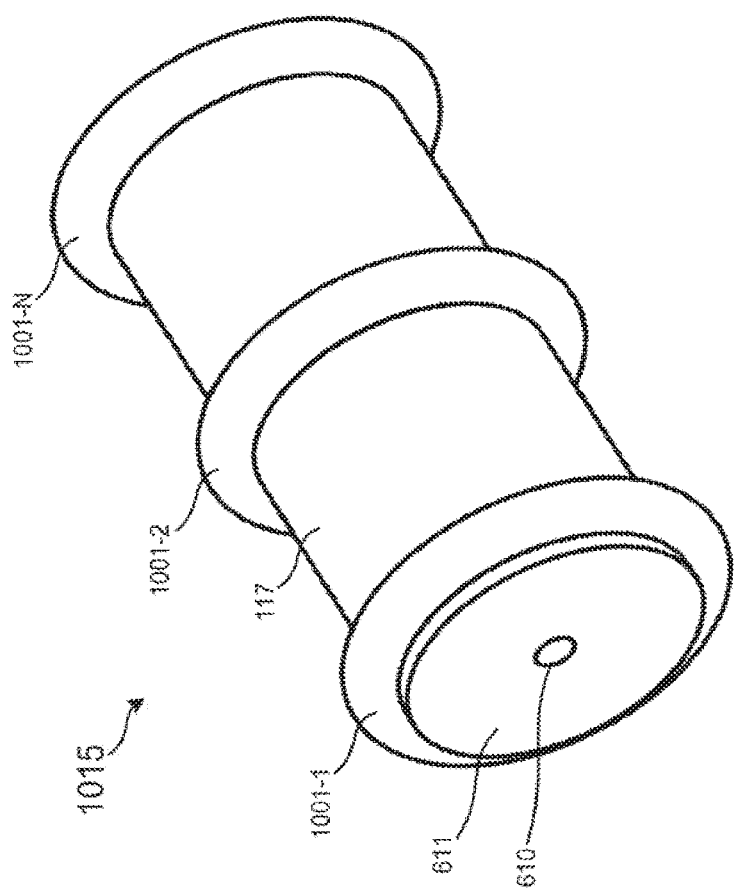
FIG. 10 depicts an example cylindrical damper element with multiple elastomer support members with circular profiles.

FIG. 10 depicts another example roller damper 1015, according to various implementations of the present disclosure. As shown, the roller damper 1015 can have a cylindrical damper body element 117 around which multiple elastomer support members 1001 having rounded profiles can be disposed around the circumference of the external surface of the cylinder. While only three elastomer support members 1001 are illustrated in FIG. 10 and two elastomer support members 401 are illustrated and other figures, implementations of the present disclosure can include up to N, where N is a natural number, elastomer support members 401 or 1001. Selection of the number of elastomer support members 401 and 1001 can be based on the longitudinal dimension, mass, or stiffness of the damper body element 117 and/or the elastomeric characteristics of the elastomer support members.

Figure 11:
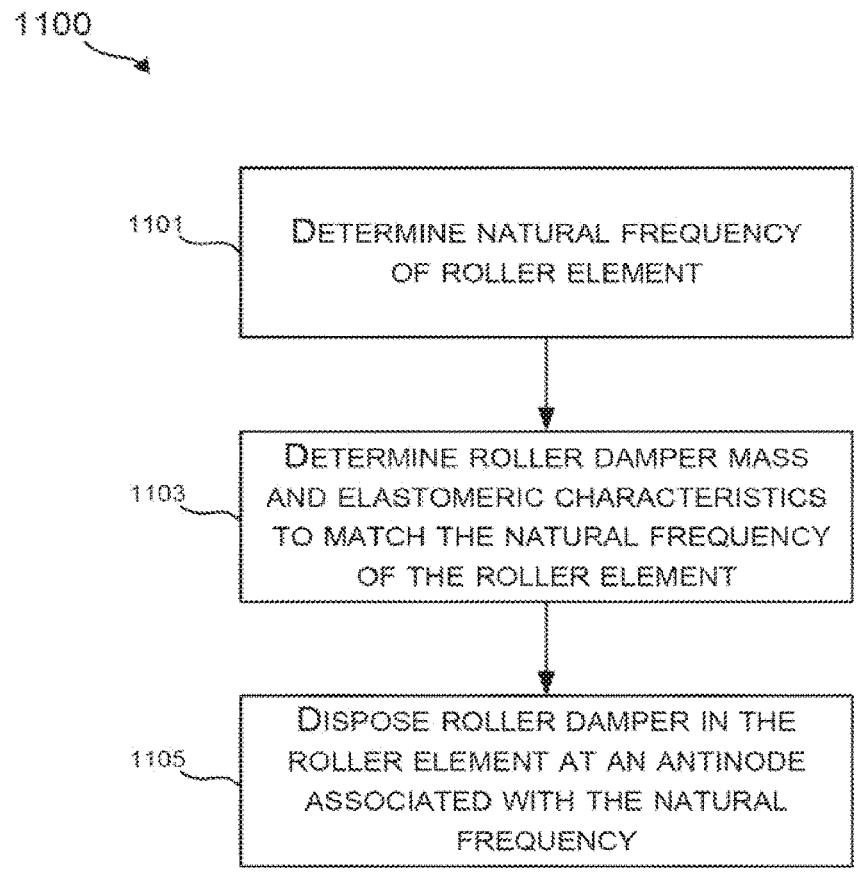
FIG. 11 is a flowchart of an example method for damping a roller.

FIG. 11 is a flowchart of an example method 1100 for damping a charge roller 110 by matching the natural frequency of a roller damper 115 to a corresponding natural frequency of a vibrational mode of a charge roller 110. Method 1100 can begin at box 1101 in which the natural frequency of a roller element (e.g., a cylindrical or tubular component of a charge roller 110) is determined. In some implementations, the natural frequency of the roller element can be determined experimentally. For example, the roller element can be mounted to a stationary object, such as a workbench, and struck to excite at least one vibrational mode. The frequency of the at least one vibrational mode can then be measured to determine the associated natural frequency. In other implementations, the natural frequency of the roller element can be determined by performing finite element simulations of the roller element.

At box 1103, an inertial mass and elastomeric characteristics of the roller damper 115 can be selected to match the natural frequency of the roller damper 115 to the natural frequency of the charge roller 115 determined in box 1101. For example, a particular combination of dimensions, volume, materials, stiffness, and/or material of the damper body element 117 can be paired with a particular combination of dimensions and elastomeric material properties (e.g., shape, size, stiffness, loss coefficient, and/or other elastomeric characteristics) of the elastomer support members 401 to achieve a natural frequency of the roller damper 115 that matches a natural frequency of a particular vibrational mode of the charge roller 110. The natural frequency of the roller damper 115 can then be measured to determine the associated natural frequency. In other implementations, the natural frequency of the roller damper can be determined by performing finite element simulations of the roller damper.

At box 1105, the roller damper 115 can then be disposed at a location of an anti-node associated with the natural frequency or vibrational mode in the roller element. For example, roller damper 115 can be inserted into the cylindrical body of the roller element until it is positioned at a location along the length L 203 associated with an anti-node of the vibrational mode. The position of the roller damper 115 can be maintained by the friction provided by the elastomer support member 401.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A roller damper for an image forming apparatus, comprising:
    a damper body element comprising a mass and having a shape to fit an interior of a tubular roller element associated with a natural frequency;
    an elastomer support member coupled to the damper body element, the elastomer support member fit within a groove extended around an exterior of the damper body element to provide friction fit between the exterior of the damper body element and the interior of the tubular roller element; and
    retaining rings at opposite ends of the damper body element to stabilize placement of the roller damper in the interior of the tubular roller element, the retaining rings separate from the damper body element and fit entirely within the interior of the tubular roller element,
    wherein the mass of the damper body element and the elastomer support member are selected based on the natural frequency of the tubular roller element.

2. The roller damper of claim 1 wherein the shape of the damper body element comprises a cylinder or sphere.

3. The roller damper of claim 1 wherein the elastomer support member comprises a plurality of elastomer bands comprising elastomeric characteristics based on the natural frequency of the tubular roller element.

4. The roller damper of claim 3 wherein the elastomeric characteristics comprise dimensions and elastomeric material properties.

5. The roller damper of claim 1 wherein the groove extended around the exterior of the damper body element is to face the interior of the tubular roller element.

6. A method comprising:
    determining a natural frequency of a roller element for an image forming apparatus;
    determining a mass and elastomeric characteristics corresponding to a natural frequency of a roller damper to match the natural frequency of the roller element; and
    disposing the roller damper in the roller element with an open hole extended longitudinally therethrough, including positioning the roller damper in the roller element at a point corresponding to an anti-node of the natural frequency of the roller element and retaining the roller damper at the point with retaining rings positioned entirely within the roller element separate from the roller damper at ends of the roller damper.

7. The method of claim 6, wherein determining the elastomeric characteristics comprises selecting an elastomer support member with material properties and dimensions that pair with the mass resulting in the natural frequency of the roller damper that matches the natural frequency of the roller element.

8. A damped roller assembly for an image forming apparatus, comprising:
    a roller element associated with a natural frequency and having an inner diameter and a length;
    a damper body element comprising a mass and having a shape to fit the inner diameter of the roller element, the damper body element positioned within the inner diameter of the roller element with an open hole extended longitudinally therethrough and disposed at a point along the length of the roller element corresponding to an anti-node associated with the natural frequency of the roller element;
    an elastomer support member coupled to the damper body element to provide friction fit with the inner diameter of the roller element; and
    retaining rings separate from the damper body element, the retaining rings having a dimension and spring constant to fit entirely within and contact the inner diameter of the roller element to capture and retain the damper body element as positioned within the inner diameter and disposed at the point along the length of the roller element.

9. The damped roller assembly of claim 8, wherein the mass of the damper body element and the elastomer support member are selected based on the natural frequency of the roller element.

10. The damped roller assembly of claim 8 wherein the elastomer support member comprises a plurality of elastomer bands comprising elastomeric characteristics based on the natural frequency of the roller element.

11. The damped roller assembly of claim 10 wherein the elastomeric characteristics comprise dimensions and elastomeric material properties.

12. The damped roller assembly of claim 10 wherein the damper body element comprises a plurality of grooves and each elastomer band of the plurality of elastomer bands is disposed in a corresponding groove of the plurality of grooves.

13. The roller damper of claim 1 wherein the damper body element is to be positioned within the interior of the tubular roller element with an open hole extended longitudinally therethrough.

14. The method of claim 6, further comprising:
    disposing an elastomer support member within a groove extended around the roller damper to provide friction fit between an outer surface of the roller damper and an internal surface of the roller element, wherein the groove faces the internal surface of the roller element.

15. The damped roller assembly of claim 8 wherein the damper body element comprises a groove extended around an outer diameter thereof and the elastomer support member is fit within the groove to provide the friction fit with the inner diameter of the roller element.

16. The damped roller assembly of claim 15 wherein the groove of the damper body element faces the inner diameter of the roller element.

17. The roller damper of claim 1 wherein the retaining rings are inserted into the tubular roller element separate from the damper body element and positioned entirely within the interior of the tubular roller element with space between the retaining rings and the ends of the damper body element.

18. The method of claim 6, wherein retaining the roller damper includes inserting the retaining rings into the roller element separate from the roller damper and positioning the retaining rings entirely within the roller element with space between the retaining rings and the ends of the roller damper.

19. The damped roller assembly of claim 8 wherein the retaining rings are insert into the roller element separate from the damper body element and fit entirely within the inner diameter of the roller element with space between the retaining rings and ends of the damper body element.

\* \* \* \* \*